United States Patent [19]
Peek et al.

[11] Patent Number: 5,317,712
[45] Date of Patent: May 31, 1994

[54] METHOD AND APPARATUS FOR TESTING AND CONFIGURING THE WIDTH OF PORTIONS OF A MEMORY

[75] Inventors: Greg A. Peek; Craig D. Cedros, both of Beaverton, Oreg.

[73] Assignee: Intel Corporation, Santa Clara, Calif.

[21] Appl. No.: 812,072

[22] Filed: Dec. 19, 1991

[51] Int. Cl.$^5$ ............... G06F 12/00; G06F 13/00
[52] U.S. Cl. ............... 395/425; 364/DIG. 1; 395/400; 395/700
[58] Field of Search ............... 395/425, 700, 400; 364/DIG. 1

[56] References Cited

U.S. PATENT DOCUMENTS

| | | | |
|---|---|---|---|
| 4,014,005 | 3/1977 | Fox et al. | 395/500 |
| 4,545,010 | 10/1985 | Salas et al. | 395/425 |
| 4,675,808 | 6/1987 | Grinn et al. | 395/400 |
| 4,951,248 | 8/1990 | Lynch | 395/425 |
| 5,109,517 | 4/1992 | Houda et al. | 395/800 |
| 5,125,080 | 6/1992 | Pleva et al. | 395/325 |
| 5,125,084 | 6/1992 | Begun et al. | 395/375 |
| 5,218,684 | 6/1993 | Hayes et al. | 395/400 |

Primary Examiner—Glenn Gossage
Attorney, Agent, or Firm—Blakely, Sokoloff, Taylor & Zafman

[57] ABSTRACT

A circuit and a related process are utilized in a computer system for testing and configuring the width of various portions of memory in a memory array. The circuit captures a state of a memory width control signal (MEMCS16) during a test and configuration cycle, retains the state of the MEMCS16 signal for various blocks of memory, and controls the state of the MEMCS16 signal when a memory access to a particular memory block is made. The circuit tests the state of the MEMCS16 signal for various blocks of the system memory map and thereafter configures a memory control register appropriately. The state of the MEMCS16 signal is retained by a latch when a particular 128K region is accessed and a valid address is present on the address lines. The output of the latch is provided as a processor-readable test result in a bit of a control/test register.

14 Claims, 3 Drawing Sheets

METHOD AND APPARATUS FOR TESTING AND CONFIGURING THE WIDTH OF PORTIONS OF A MEMORY

BACKGROUND OF THE INVENTION

1. Field of the Invention

The present invention relates to computer systems. Specifically, the present invention relates to the configuration and control of a computer memory array and expansion memory arrays.

2. Related Art

Computer systems almost always contain some form of memory. This memory is typically organized in the form of a memory array with each addressable memory location in the array comprising a group of binary data bits of information. The number of data bits corresponding to a particular memory location defines the width of that memory location. In a typical computer system, a memory width of 8-bit bytes or 16-bit words is very common. Other memory widths such as 32-bit, 64-bit, and 128-bit wide memory locations are also used in many computer system applications. The width of memory arrays in other computer systems may use any arbitrary number of bits per memory location.

It is often convenient to configure a memory array with some locations of the array having a first width and other memory locations of the array having a second width different from the first width. Similarly, other computer systems may employ a variety of different memory widths. Memory arrays are configured using various widths in order to optimize the available storage for selected address blocks (ranges of addressable memory). This optimization may be used, for example, if a particular type of data of a given width is stored in a specified address block. In other situations, a particular address block may be constrained to a particular width in order to maintain compatibility of the computer system with other similar computer systems. In still other situations, a particular address block may physically reside in an expansion memory board different from the hardware used for main memory. It is convenient to provide the capability for expansion memory to be a variable width depending on the storage requirements for a particular computer system. In this manner, the cost of expansion memory may be optimized.

Other factors may contribute to the need for more than one width of memory locations in the memory array. These other factors include the speed of the memory devices, the availability of memory devices, the technology needed for a particular address block (dynamic random access memory or DRAM, static random access memory or SRAM, read only memory or ROM, complementary metal oxide semiconductor or CMOS, etc.), and the cost of a particular memory device.

Once a computer system supports multiple memory widths, the memory control function of the memory array becomes more difficult. The processor making access to the memory array must be aware of the width of the memory array being accessed. Moreover, a memory array controller must generate the appropriate timing and control signals corresponding to the appropriate memory width. In prior art computer systems, particularly personal computer systems, hardware jumpers are used in the memory array to define the width of memory locations at pre-determined address regions. For example, extended memory boards, available for many personal computer systems, contain hardware jumpers by which a user may configure the memory board for a 16-bit wide data word for greater efficiency or an 8-bit wide data byte for compatability with other systems. Once the jumpers are configured on the memory board, the user installs the memory board in the computer system and powers up the system for use. The jumpers on the memory board result in the generation of a memory control signal by the memory board to the processor or other computer system component that makes a memory access. This memory control signal, commonly called a MEMCS16 signal, defines whether or not the memory board can supply an 8-bit or a 16-bit data word on a memory access. The processor or other device making access to memory, therefore uses the MEMCS16 signal to define the number of data bits to receive.

Significant problems result if the jumpers on a memory board are improperly configured. In this case, an invalid MEMCS16 signal will be generated to the processor and an invalid memory access will result. Other problems are encountered when more than one expansion board is installed in a computer system. In this case, each expansion board may contain circuitry for independently driving the MEMCS16 signal. In some circumstances, the operation of two expansion boards may conflict in controlling the state of the MEMCS16 signal. This may occur if two expansion boards are mapped to the same memory space. This may also occur if an expansion board is mapped to an incompatible memory area such as a boot ROM area. An expansion board is mapped to an incompatible area if, for example, the expansion board is configured for 16-bit word accesses when the mapped area can only provide an 8-bit byte access. These expansion board conflicts may cause a seemingly properly configured expansion board to become inoperable when another expansion board is inserted into the computer system. Significant problems, traceable to the control of a memory width signal (MEMCS16), result from an improperly configured and controlled MEMCS16 signal or memory width control signal.

Thus, a better means for controlling a signal specifying the width of blocks of memory in a computer memory array is needed.

SUMMARY OF THE INVENTION

The present invention is a circuit used in a computer system for testing and configuring the width of various portions of memory in a memory array. The circuit of the present invention captures the state of a memory width control signal (MEMCS16) during a test and configuration cycle, retains the state of the MEMCS16 signal for various blocks of memory, and controls the state of the MEMCS16 signal when a memory access to a particular memory block is made.

The circuit of the present invention comprises a control/test register including at least one bit for enabling a memory width test cycle and a second bit for storing a result of the memory width test cycle. The test enable bit must be a programmable bit that may be written or modified by a processor. The test result bit may be read by a processor.

The circuit of the present invention also includes a memory control register which contains a plurality of bits each corresponding to a distinct region of a system memory map. Each bit is used to identify whether the corresponding region of the system memory map is 8 bits or 16 bits wide. It will be apparent to those skilled in the art that any particular memory width other that 8 or 16 bits may equivalently be encoded into the memory control register.

The circuit of the present invention further includes an address decoder to which memory control lines are input. An early address is also provided as input to the address decoder. The early address (LA) represents an upper portion of the address for a memory access request made by the processor or other system controller. System address (SA) lines are also provided as input to the address decoder. System address lines represent a lower portion of the address for a memory access request. In order to anticipate the region of memory being accessed, the early address signals are provided to the address decoder at an earlier time in a memory access cycle than the system address signals.

The address decoder is responsible for receiving an address presented on early address lines and system address lines. Based on the address region accessed according to the early address and system address signals, the corresponding memory control bit of the memory control register is selected by the address decoder. Depending on the condition of the corresponding bit in the memory control register, the proper output memory control signal (denoted MEMCS16) identifying the width of the accessed memory area is output by the address decoder. Similarly, a control signal (denoted 128K MEMSEL) is output by the address decoder that identifies whether the memory access address is an access to a particular 128K of the system memory map (i.e. an access within a predetermined 128K address range). Using the 128K MEMSEL signal, memory control lines can be associated with a predetermined 128K block of the system memory map.

The present invention includes a means for testing the condition of the MEMCS16 signal for various blocks of the system memory map and thereafter configuring the memory control register appropriately. This testing means of the present invention includes the test enable bit of the control/test register. The test enable bit is coupled to the input side of an AND gate. The 128K MEMSEL signal from the address decoder is also provided as input to the AND gate. In the test or configuration mode, the test enable bit is asserted by a processor. When the test enable bit is asserted, the AND gate is deasserted which disables the output of the MEMCS16 signal from an output buffer. Thus, in test mode, the MEMCS16 signal is not provided to other components of the computer system.

The testing means of the present invention also includes a NAND gate, the output of which is tied to the clock input of a latch. Input signals to the NAND gate include the 128K MEMSEL signal, the MEMCS16 signal, and a signal denoted the address latch enable (ALE) signal. The ALE signal is a well known signal used in conventional memory control systems for latching an address presented on system address lines. The ALE signal is asserted when a valid address is present on the address lines. When each of these input signals to the NAND gate are active, the NAND gate is enabled to activate the clock input of the latch. On activation of the clock input, the latch captures and retains the state of the MEMCS16 signal at the time the input signals to the NAND gate are all active. Thus, the state of the MEMCS16 signal is retained by the latch when the particular 128K region is accessed and a valid address is present on the address lines. The output of the latch is provided as a test result in a bit of the control/test register. This result bit is readable by the processor.

The test or configuration mode of the present invention is provided mainly for the purpose of configuring the contents of the memory control register. Test software or processing logic for controlling the operation of the test/configuration mode is provided in a random access memory and executed by the processor. This test software or processing logic starts by asserting one of the bits in the memory control register. For this first test, all other bits of the memory control register are set to a deasserted value. Next, an address corresponding to the portion of memory associated with the bit set in the memory control register is provided to the address decoder. As a result of this input address, the address decoder generates a memory width control signal (MEMCS16) and the 128K MEMSEL signal. When an address latch enable (ALE) signal becomes active during the normal course of a memory cycle, the NAND gate will clock the latch to capture the condition of the MEMCS16 signal as the falling edge of the ALE signal occurs. The condition of the MEMCS16 signal at this time is retained by the latch and posted to a bit of the control/test register. The results of this test for the portion of memory under test may be read from the control/test register and recorded in a software data base structure.

The next test may be initiated by asserting a different bit in the memory control register corresponding to the next address range under test, and deasserting all other bits in the memory control register. The procedure described above may be repeated for this memory address range and the corresponding condition of the MEMCS16 signal read from a bit of the control/test register and similarly recorded in a data base structure. Iterations of this procedure may be performed for each of the control bits (and corresponding address ranges) within the memory control register. At the completion of these test iterations, a data structure in memory will contain the dynamically determined widths for each of the tested blocks of the system memory map. The results of these tests may be used to re-configure the memory control register, if necessary, by loading each bit of the memory control register corresponding to the dynamically determined test results.

It is therefore an object of the present invention to provide a circuit in a computer system for configuring the operation of computer system memory control signals. It is a further object of the present invention to provide a circuit including a programmable register wherein a memory width control signal may be programmably configured. It is a further object of the present invention to provide a circuit including a programmable register wherein a memory width control signal test and configuration mode may be enabled or disabled. It is a further object of the present invention to provide a circuit including a programmable register wherein the results of a memory width control signal test may be read. It is a further object of the present invention to provide a circuit including a latch for retaining the state of a memory width control signal at a time in a memory access cycle when the address is valid. It is a further object of the present invention to provide a circuit including a means for suppressing the output of a memory width control signal during an active test cycle.

These and other objects of the present invention will become apparent as presented and described in the following detailed description of the preferred embodiment of the present invention.

DETAILED DESCRIPTION OF THE PREFERRED EMBODIMENT

The present invention is a circuit used in a computer system for testing and configuring the width of various portions of memory in a memory array.

In the following description, numerous specific details are set forth in order to provide a thorough understanding of the invention; however, it will be apparent to one of ordinary skill in the art that these specific details need not be used to practice the present invention. In other circumstances, well known structures, circuits, and interfaces have not been shown in detail in order not to unnecessarily obscure the present invention.

Figure 1:
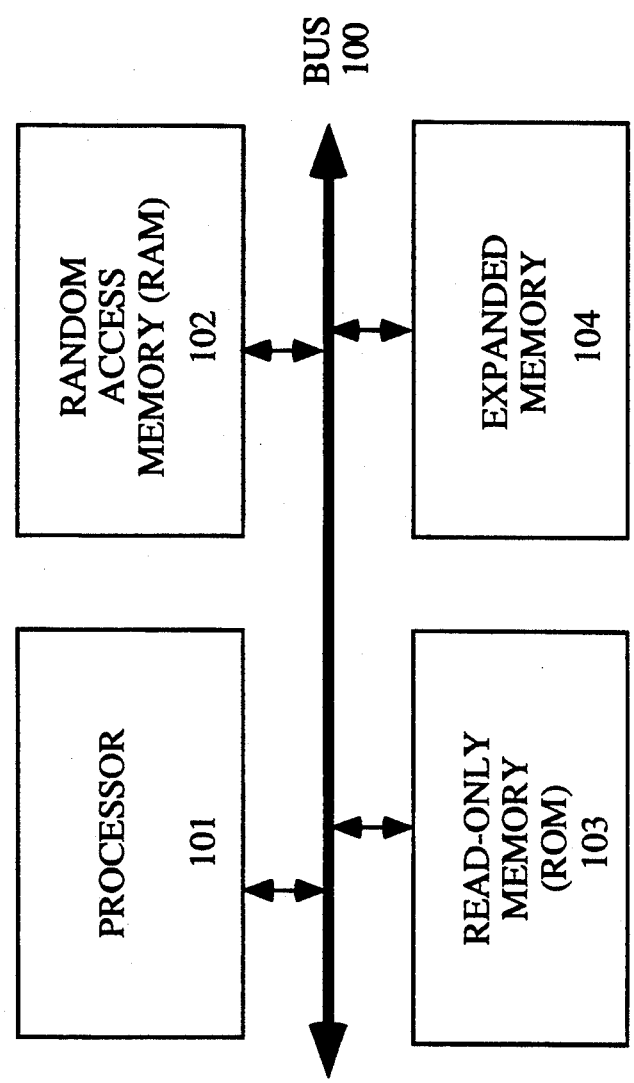
FIG. 1 is an illustration of a typical computer system in which the circuit of the preferred embodiment operates.

Referring to FIG. 1, a block diagram of the architecture of a typical computer system in which the present invention operates is illustrated. In general, such computer systems, as illustrated by FIG. 1, comprise a bus 100 for communicating information, a processor 101 coupled with the bus for processing information, a random access memory (RAM) 102 coupled with the bus 100 for storing information and instructions for the processor 101, a read only memory (ROM) 103 coupled with the bus 100 for storing information and instructions for the processor 101, and optionally, an expanded memory board 104 coupled to the bus 100 and providing additional random access memory area for use by processor 101.

The preferred embodiment of the present invention is implemented on an IBM PC brand personal computer system manufactured by International Business Machines (IBM) Corporation, Armonk, N.Y. Bus 100 in the preferred embodiment is a 16-bit Industry Standard Architecture (ISA) bus. It will be apparent to those of ordinary skill in the art, however, that alternative computer systems may be employed for use with the present invention.

Figure 2:
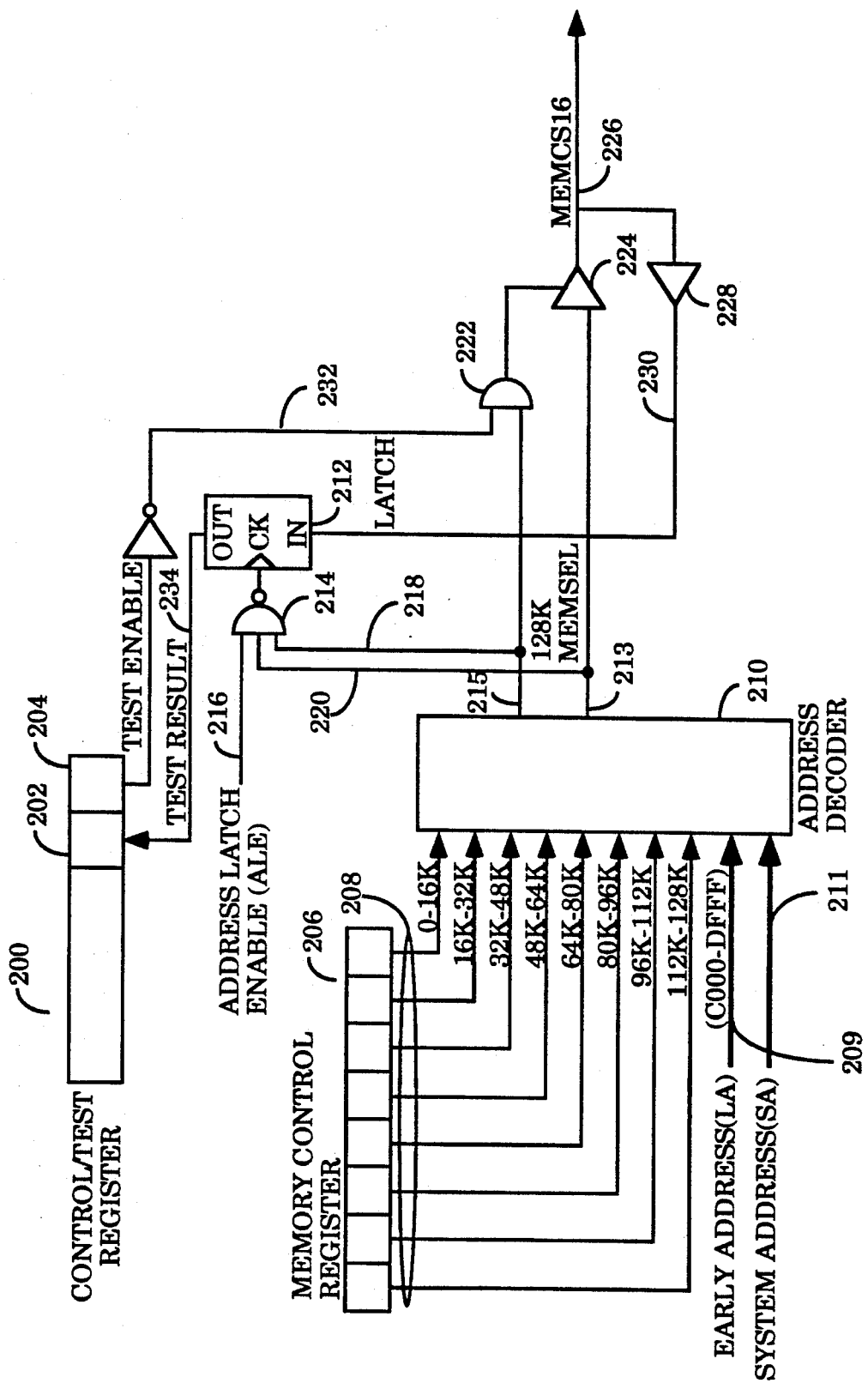
FIG. 2 is a block diagram illustration of the logic circuitry of the preferred embodiment.

Referring now to FIG. 2, a circuit diagram of the present invention is illustrated. The circuit of the present invention is used to: capture the state of a memory width control signal (MEMCS16) during a test and configuration cycle; to retain the state of the MEMCS16 signal for various blocks of memory; and to control the state of the MEMCS16 signal when a memory access to a particular memory block is made. The present invention allows software executing within processor 101 to determine the width of memory that may be present (i.e., 8-bit, 16-bit, or other width). The circuit of the present invention can then be configured to allow an expansion board such as expanded memory 104 to operate correctly while sharing a single 128K address block with other 8-bit and/or 16-bit memories.

In typical bus-oriented computer systems, such as the one illustrated in FIG. 1, a memory expansion board such as expanded memory 104 may be optionally used to provide additional memory for a processor 101. This additional expanded memory may be 8 bits or 16 bits wide. A 16-bit wide expanded memory allows faster system throughput and is therefore desirable. However, because of the timing relationships between the generation of a valid address by processor 101 and the generation of an MEMCS16 signal by an expanded memory board 104, it may be very difficult to have 8-bit and 16-bit memory devices co-exist within a single 128K region of the system memory map. Often, the only available region in the system memory map of a particular computer system is a 128K region from the addresses 0C0000 to 0DFFFF (in hex). Many types of memory boards or other system resources may need to use small portions of this address space, such as 2K by 8-bit read only memories used for bootstrap loading (Boot ROMs), 64K by 16-bit expanded memory boards, and/or 16K by 8-bit memory mapped buffers for input/output (I/O) boards (not shown). Typically, if there is any 8-bit wide memory provided by any board or system resource within a 128K system memory map region, then all boards or resources that wish to share that region must be configured to 8-bit memory. Thus, system throughput in a particular computer system is reduced by the necessity to reduce the available memory width to 8 bits. The circuit of the present invention, however, overcomes these problems by allowing software running within processor 101 to dynamically determine the width of memory provided by other expansion boards or system resources and then configure a target expansion board to co-exist with other boards in the system.

Referring now to FIG. 2, the circuit of the preferred embodiment of the present invention is illustrated. The circuit of the present invention may be incorporated within expanded memory 104 or alternatively within processor module 101.

The circuit of FIG. 2 comprises a control/test register 200 including at least one bit 204 for enabling a memory width test cycle and a second bit 202 for storing a result of the memory width test cycle. Test enable bit 204 must be a programmable bit that may be written or modified by the processor 101. Test result bit 202 may be read by processor 101. A means for reading, writing, or modifying a programmable bit or bits in a register is well known in the art.

The circuit of FIG. 2 also includes a memory control register 206 which contains a plurality of bits each corresponding to a distinct region of the system memory map. Each bit is used to identify whether the corresponding region of the system memory map is 8 bits or 16 bits wide. In the preferred embodiment, each bit in memory control register 206 corresponds to a 16K block of the system memory map. It will be apparent to those skilled in the art, however, that a different block size may equivalently be used. It will also be apparent to those skilled in the art that more than one bit may be used to correspond to each block of the system memory map. Thus, two bits in memory control register 206, for example, may be used to identify the distinct width for a particular block of the system memory map.

Memory control lines 208 are input to an address decoder 210 from memory control register 206. An early address 209 is also provided as input to address decoder 210 from other portions (not shown) of expanded memory 104 or processor module 101. Early address (LA) 209 represents an upper portion of the address for a memory access request made by processor 101 or other system controller. The system address (SA) lines 211 are also provided as input to address decoder 210. System address lines 211 represent a lower portion of the address for a memory access request. In order to anticipate the region of memory being accessed, the early address signals on lines 209 are provided to address decoder 210 at an earlier time in a memory access cycle than system address signals on lines 211. The use of early address and system address lines and the relative timing thereof is well known to those of ordinary skill in the art.

Address decoder 210 is responsible for receiving an address presented on early address lines 209 and system address lines 211. Based on the address region accessed according to the signals presented on lines 209 and 211, the corresponding memory control bit of memory control register 206 is selected. Depending on the condition of the corresponding bit in memory control register 206, the proper output memory control signal (denoted MEMCS16) identifying the width of the accessed memory area is output on line 213. Similarly, a control signal (denoted 128K MEMSEL) is output on line 215 that identifies whether the address received on lines 209 and 211 is an access to a particular 128K of the system memory map (i.e. an access within a predetermined 128K address range). Using the 128K MEMSEL signal, memory control lines 208 can be associated with a predetermined 128K block of the system memory map.

The present invention provides a means for testing the condition of the MEMCS16 signal for various blocks of the system memory map and thereafter configuring the memory control register 206 appropriately. This testing means of the present invention includes test enable bit 204 of control/test register 200. Test enable bit 204 is coupled to the input side of AND gate 222 via an inverter and line 232. The 128K MEMSEL signal 215 from address decoder 210 is also provided as input to AND gate 222. In the test or configuration mode, test enable bit 204 is asserted by processor 101. When the test enable bit 204 is asserted, AND gate 222 is deasserted which disables the output of the MEMCS16 signal from buffer 224. Thus, in test mode, the MEMCS16 signal is not provided to other components of the computer system via line 226.

The testing means of the present invention also includes NAND gate 214, the output of which is tied to the clock input of latch 212. Input signals to NAND gate 214 include the 128K MEMSEL signal on line 218, the MEMCS16 signal on line 220, and a signal 216 denoted the address latch enable (ALE) signal. The ALE signal is a well known signal used in conventional memory control systems for latching an address presented on system address lines. The ALE signal may be provided to the circuit of the present invention from other portions (not shown) of expanded memory 104 or processor module 101. The ALE signal 216 is asserted when a valid address is present on address lines 209 and 211. When each of these signals (i.e., signals 218, 220, and 216) is active, the output of NAND gate 214 activates the clock input of latch 212. On activation of the clock input, latch 212 latches the input signal received on line 230 and provides the latched data as output on line 234. The input signal provided to latch 212 on line 230 is the state of the MEMCS16 signal at the time the input signals to NAND gate 214 are all active. Thus, the state of the MEMCS16 signal is retained by latch 212 when the particular 128K region is accessed and a valid address is present on address lines 209 and 211. The output of latch 212 is provided as a test result in bit 202 of control/test register 200. This result bit 202 is readable by processor 101. A means for reading, writing, or modifying a programmable bit or bits in a register is well known in the art.

The test or configuration mode of the present invention is provided mainly for the purpose of configuring the contents of memory control register 206. Software for controlling the operation of the test/configuration mode is provided in random access memory 102 and executed by processor 101. This test software or processing logic starts by loading one of the bits in memory control register 206 with a known value. For example, the bit in memory control register 206 corresponding to the 0-16K range of the desired 128K region of the system memory map may be set to a high value. In the preferred embodiment, a high value for a bit in memory control register 206 indicates that the corresponding 16K block is 8 bits wide; a low value indicates a 16 bit wide block. For this first test, all other bits of memory control register 206 are set to a low value. Next, an address corresponding to the 0-16K portion of the desired 128K address region is applied to address lines 209 and 211. As a result of this input address, address decoder 210 generates a memory width control signal on line 213 and the 128K MEMSEL signal on line 215. During test mode, the 128K MEMSEL signal on line 215 will be high because the test processing logic will always be accessing a 128K region of the system memory map which is under test. Thus, when the address latch enable (ALE) signal 216 becomes active during the normal course of a memory cycle, NAND gate 214 will clock latch 212 to capture the condition of the MEMCS16 signal through buffer 228 on line 230 as the falling edge of the ALE signal 216 occurs. The condition of the MEMCS16 signal at this time is retained by latch 212 and posted to bit 202 of control/test register 200. The results of this test for the 0-16K block test may be read from control/test register 206 and recorded in a software data base structure.

The next test may be initiated by asserting the bit in memory control register 206 corresponding to the next address range (i.e., 16K-32K), and deasserting all other bits in memory control register 206. The procedure described above may be repeated for this memory address range and the corresponding condition of the MEMCS16 signal read from bit 202 of control/test register 200 and similarly recorded in a data base structure. Iterations of this procedure may be performed for each of the control bits (and corresponding address ranges) within memory control register 206. At the completion of these test iterations, a data structure in memory will contain the dynamically determined widths for each of the tested blocks of the system memory map. The results of these tests may be used to reconfigure memory control register 206, if necessary, by loading each bit of memory control register 206 corresponding to the dynamically determined test results. For example, if an 8-bit block of the system memory map is detected, it may be necessary to configure other bits in memory control register 206 for 8-bit blocks in order to prevent memory access errors.

Figure 3:
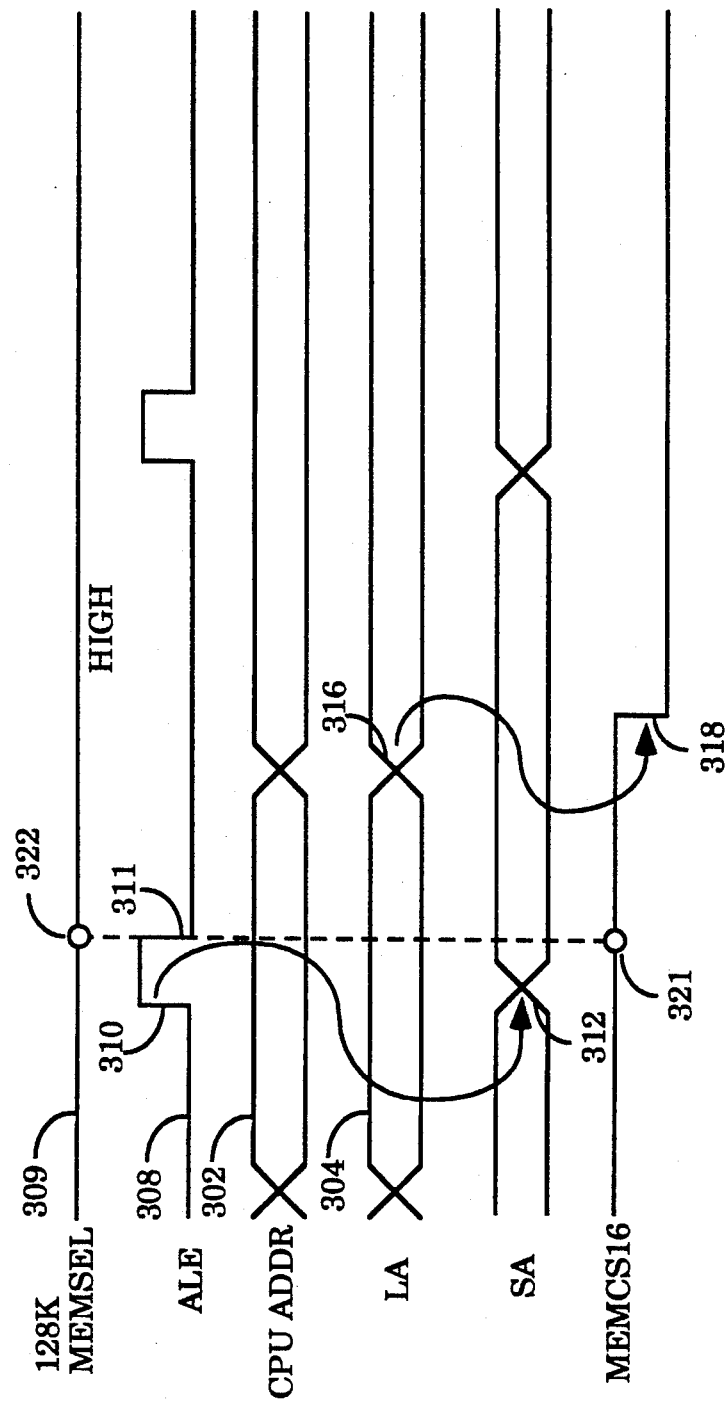
FIG. 3 is a timing diagram illustrating the relationship of the signals used by the present invention.

Referring now to FIG. 3, a timing diagram illustrating the relationship of the various signals used by the present invention is illustrated. Initially, processor 101 provides address signals (CPU ADDR) 302 to initiate a memory access. At about the same time, the early address lines (LA) 304 are provided to preview or anticipate the address region that is subsequently addressed. A short time later a rising edge 310 of the address latch enable (ALE) signal 308 causes a transition 312 to occur in the system address (SA) lines. Once the state of the system address (SA) lines has stabilized, the address thus presented by the combination of the LA lines and the SA lines may be latched as the valid address. The address is thus latched by the falling edge 311 of ALE signal 308. At the falling edge 311 of ALE signal 308, the test means of the present invention will latch the state of the MEMCS16 signal at time 321 indicated in FIG. 3., since the 128K MEMSEL signal 309 is also high at this time. The latched MEMCS16 signal, therefore corresponds to a point in the memory access cycle when the address presented on the LA and SA lines is valid. Having been latched, the state of the MEMCS16 signal may change (i.e. edge 318) at a later time upon the transition of the early address lines at edge 316. The latched state of the MEMCS16 signal, however is retained. A similar memory access cycle may be initiated for each of the memory address regions defined within memory control register 206.

Thus, a means for automatically predetermining and configuring the widths of various portions of a memory array in a computer system is disclosed.

It will be readily apparent to those skilled in the art that a signal line may be asserted high or asserted low, with a positive or negative voltage thereon, or with current flowing or not flowing, with line driving circuits energized or not energized, depending upon the convention chosen for a particular design implementation. Therefore, it is to be understood that the terms "assert," "asserted," "assertion," "asserting," "deassert," "deasserted," "deassertion," and "deasserting" as used throughout this specification and claims, in reference to input and output lines and signals thereon, mean that the line is asserted either high or low, so long as the same convention is maintained throughout the particular design implementation.

Although the invention is described herein with reference to a specific embodiment, many modifications and variations therein will readily occur to those skilled in the art. Accordingly, all such variations and modifications are included within the intended scope of the present invention as defined by the following claims.

We claim:

1. A circuit for testing and configuring a width of various portions of memory, comprising:
   an address decoder for receiving an address presented on address lines coupled to said address decoder and for generating a memory control signal on an output line, a state of said memory control signal specifying a width of a portion of the memory corresponding to said address;
   a latch coupled to said output line for retaining the state of said memory control signal, said latch being activated when a valid address is presented on said address lines; and
   a control/test register coupled to said latch for receiving the state of said memory control signal retained by said latch, said control/test register being readable by a processor.

2. The circuit as claimed in claim 1 further comprising means for programmably enabling the output of said memory control signal.

3. The circuit as claimed in claim 1 wherein said latch is activated only if said address is within a predetermined range.

4. The circuit as claimed in claim 1 wherein said latch is activated in response to activation of an address latch enable signal received by said latch.

5. The circuit as claimed in claim 1 further including a memory control register coupled to said address decoder, said memory control register having a plurality of programmable bits for configuring a width of the memory, each of said programmable bits corresponding to a portion of the memory, a state of each of said programmable bits specifying one of two widths for the corresponding portion of the memory.

6. The circuit as claimed in claim 5 wherein each of said programmable bits selectively specifies a width of 8 bits or a width of 16 bits for the corresponding portion of memory.

7. A process for testing and configuring a width of various portions of a memory in a circuit having an address decoder for generating a memory control signal, a latch coupled to said address decoder for retaining a state of said memory control signal, and a control/test register coupled to said latch for receiving the state of said memory control signal retained by said latch, said control/test register being readable by a processor, said process comprising the steps of:
   providing an address and a memory width signal indicating a memory width to said address decoder, said memory width being the width of a corresponding portion of memory, said portion including a memory location specified by said address;
   latching said memory control signal generated by said address decoder, said latching step being performed by said latch when a valid address is provided to said address decoder; and
   reading the state of said memory control signal latched in said latching step.

8. The process as claimed in claim 7 further including a step of programmably enabling the output of said memory control signal.

9. The process as claimed in claim 7 wherein said memory width signal is provided in said providing step by a memory control register coupled to said address decoder, said memory control register having a plurality of programmable bits for configuring a width of the memory, each of said programmable bits corresponding to a portion of the memory, a state of each of said programmable bits specifying one of two widths for the corresponding portion of the memory.

10. The process as claimed in claim 7 wherein said memory width signal provided to said address decoder in said providing step selectively indicates either a width of 8 bits or a width of 16 bits for the corresponding portion of memory.

11. The process as claimed in claim 7 wherein said latching step is performed only if said address is within a predetermined range.

12. The process as claimed in claim 7 wherein said latching step is performed in response to activation of an address latch enable signal received by said latch.

13. The process as claimed in claim 7 wherein said reading step further comprises the steps of:
   storing the state of said memory control signal latched in said latching step into said control/test register; and reading the state of said memory control signal latched in said latching step from said control/test register.

14. A means for testing and configuring a width of various portions of a memory in a circuit having an address decoder for generating a memory control signal, a latch coupled to said address decoder for retaining a state of said memory control signal, and a control/test register coupled to said latch for receiving the state of said memory control signal retained by said latch, said control/test register being readable by a processor, said means for testing and configuring comprising:

means for providing an address and a memory width signal indicating a memory width to said address decoder, said memory width being the width of a corresponding portion of memory, said portion including a memory location specified by said address;

means for latching said memory control signal generated by said address decoder when a valid address is provided to said address decoder; and means for reading the state of said memory control signal latched by said means for latching.

* * * * *